Jan. 3, 1939. P. CARPENTER 2,142,669
LAWN MOWER SHARPENING MACHINE
Filed Jan. 31, 1936 4 Sheets-Sheet 2
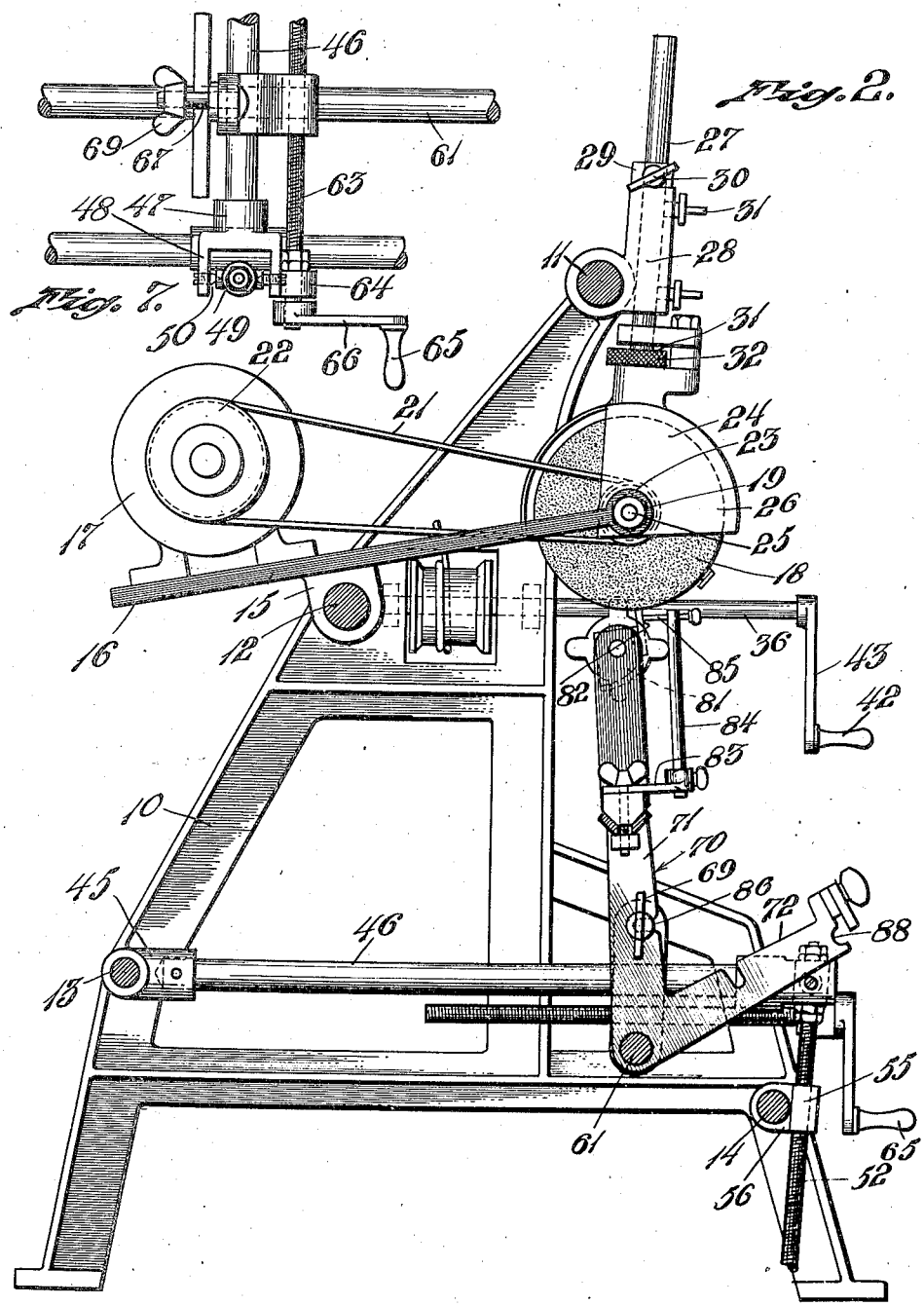
INVENTOR.
Pardom Carpenter
BY Barlow & Barlow
ATTORNEYS.

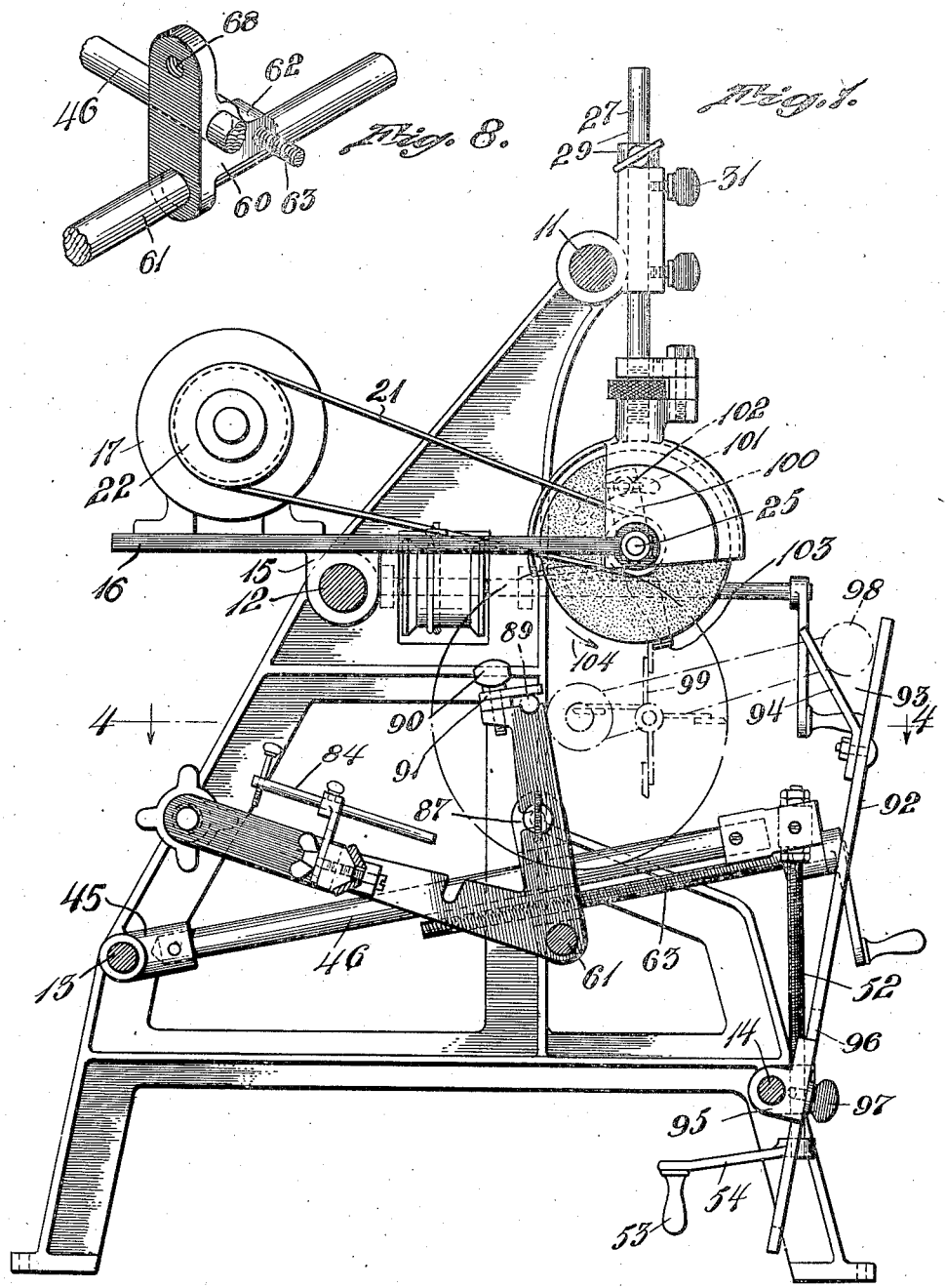

Jan. 3, 1939. P. CARPENTER 2,142,669
LAWN MOWER SHARPENING MACHINE
Filed Jan. 31, 1936 4 Sheets-Sheet 3
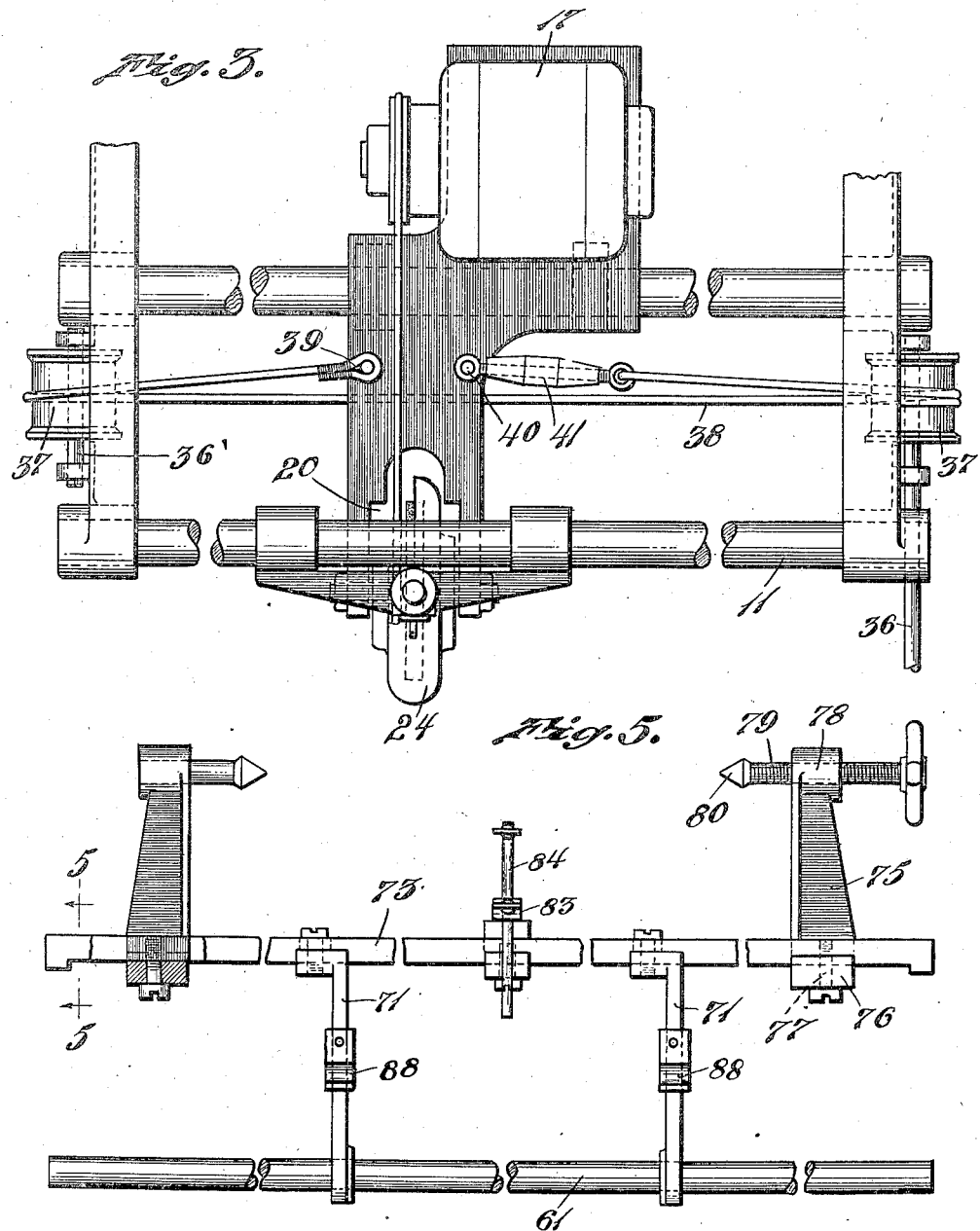
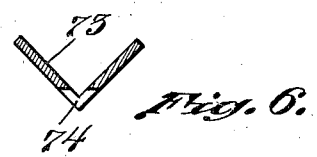
INVENTOR.
Purdom Carpenter
BY Barlow & Barlow
ATTORNEYS.

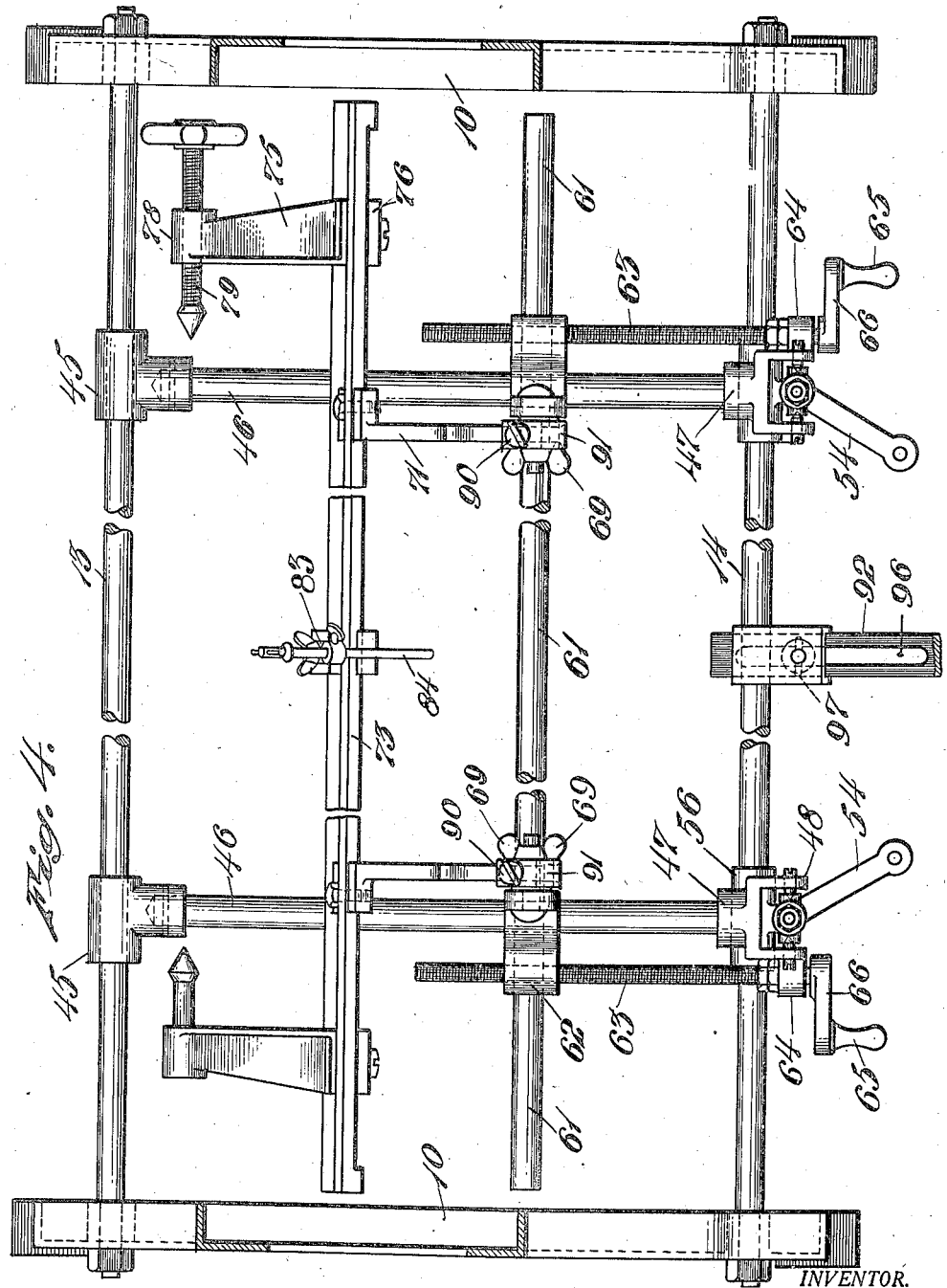

Patented Jan. 3, 1939

2,142,669

UNITED STATES PATENT OFFICE 2,142,669

LAWN MOWER SHARPENING MACHINE

Purdom Carpenter, Barrington, R. I.

Application January 31, 1936, Serial No. 61,666

6 Claims. (Cl. 51—34)

This invention relates to a lawn mower sharpening machine; and has for one of its objects the provision of a mounting for at one time supporting both the straight edged cutter and the rotary cutter of a lawn mower, so that either may be selectively moved into engagement with the cutting tool for the sharpening of the cutting edge thereof.

Another object of the invention is an arrangement by which an edge with a uniform bevel across the same may be obtained along both the rotary and the straight edged knife portions of the lawn mower.

Another object of the invention is the provision of an arrangement by which a skilled operator need not be employed for sharpening a lawn mower.

Another object of the invention is the ease of movement of the sharpening tool along the work.

Another object of the invention is a universal adjustment by which the work cradle may be moved to different heights or towards or from the work in order that the desired position may be obtained, and when once set will remain set at a predetermined point for sharpening all of the different blades of the rotary unit.

With these and other objects in view, the invention consists of certain novel features of construction, as will be more fully described, and particularly pointed out in the appended claims.

In the accompanying drawings:

Fig. 1 is a sectional view of my machine illustrating in dotted lines the rotary portion of a lawn mower as in position for sharpening;

Fig. 2 is a similar view showing the work cradle as moved to a different position and showing in this position the straight edged portion of the lawn mower as mounted in operating or working position;

Fig. 3 is a top plan view of the carriage for the grinding tool and its mounting;

Fig. 4 is a sectional view on the dot dash line of Figure 1 looking in the direction of the arrow;

Fig. 5 is an elevational view of the work cradle looking at it from the front of the machine in the position shown in Figure 2;

Fig. 6 is a sectional view on line 5—5 of Figure 5;

Fig. 7 is a top plan view of a fragmental portion of the machine showing the relative connection of some of the parts;

Fig. 8 is a perspective view showing in further detail the relative connection of the rods of the machine.

In the use of lawn mower sharpening machines, it is frequently necessary in the machines which are now in use to separably mount the rotary cutting member in its position in the machine and the straight edged portion of the mower, necessitating different adjustments for the work carriage. In order that these two parts which are necessary to grind or sharpen may be mounted in the machine at the same time, I have provided a cradle which will carry both of these parts and which may be operated so that either one or the other may be selectively brought into engagement with the sharpening tool for operation of this tool on the work; and I have also so mounted the operating tool that the motor which drives it moves with it in a more or less counterbalanced relation so that easy movement of the tool may be had; and the following is a more detailed description of the present embodiment of this invention illustrating the preferred means by which these advantageous results may be accomplished:

With reference to the drawings, I have provided two standards 10 which are connected together by four rigid bars 11, 12, 13 and 14, to hold these standards in the desired spaced relation. The rod 12 is in effect a track upon which there is mounted a pair of brackets 15 which support a platform 16 of the carriage which may be tilted about the rod 12 or track, as a center, and is also slidable therealong.

Upon this carriage an electric motor 17 is mounted at one side of the track 12, while a grinding wheel or tool 18 is located at the other side of the track and is mounted in bearings 19 in the carriage at either side of a suitable slot 20 provided in the platform of the carriage. A suitable belt 21 is trained about pulleys 22 and 23 to drive the grinding wheel or tool from the motor 17.

A guard 24 is securely mounted on the carriage and is positioned about the wheel having an opening receiving the shaft 25 upon which the wheel is mounted and with its sides 26 just inside of the bearings for the shaft 25. A rod 27 extends upwardly sub-vertically from this guard and through a sleeve 28 which is slidingly and rockably mounted upon the guide rod 11. A collar 29 may be held in position on the rod 27 by a wing nut 30 to engage the top of this sleeve 28 and limit the downward movement of the rod and thus limit the movement of the tool 18 towards the work by a very firm support; or if desired, set screws 31 in the sleeve 28 may hold the rod 27 in its set position. A nut 32 held in the slot 33 in the upper portion of the guard threadingly engages the rod 27 so that final adjustment as to position of the wheel may be had.

Shafts 36, 36' are mounted in each of the standards at the ends of the machine and upon each of these shafts there is mounted a drum 37 over which a flexible cord 38 is trained with a sufficient number of turns to obtain the desired friction against slipping. The opposite ends of this cord are attached to the carriage as at 39 and 40, the same being adjusted as to tension by the turn buckle 41. Rotation of the shaft 36 by the handle 42 and crank arm 43 serves to move the carriage back and forth across the machine in accordance with the direction of manual manipulation.

Upon the rod 13 a pair of T-shaped sockets 45 are mounted from which rod 46 extends forwardly. At the forward ends of this rod 46 a member 47 is mounted having bifurcated arms 48. Between these arms a swivel 49 is mounted on gimbals 50 consisting of a pair of threaded members having conical pivot ends so that the swivel may operate. A threaded shaft 52 is rotatably held in this member and may be turned by a handle 53 and crank arm 54. This shaft extends through a threaded sleeve or nut 55 slidingly and swingingly mounted upon the shaft 14 by means of the sleeve 56. Thus as this threaded shaft 52 is turned, the rod 46 may be raised or lowered, as desired.

At a point spaced from the end of the rod 46, I have provided a member 60, the shape of which is best shown in Figure 7, through which there extends a rod 61 at right angles to the rod 46. This member 60 is provided with a nut portion 62 receiving the threaded shaft 63 which is mounted in the boss 64 carried by the member 47, which threaded shaft may be turned by means of a handle 65 and crank arm 66. This member also carries a threaded pin 67 secured in the threaded opening 68 and on which there is mounted a wing nut 69 for the purposes presently described.

The rod 61 may be moved backwards or forwardly in the machine by rotation of the handle 65 or it may be moved upwardly or downwardly by reason of its being carried by the rod 46 which may be moved up and down by means of a handle 53.

I have mounted upon the rod 61 which is capable of the up and down, forward and backward movements a pair of V-shaped members designated generally 70 and having arms 71 and 72. The arms 71 are connected together at their ends by an angle iron 73 which is cut away from its lower or right angular junction of its parts, as at 74, so as to provide a slot; and I have mounted in this slot arms 75 which fit within the V and which are held in position by a clamp plate 76 and threaded bolt 77 extending through the slot and into a portion at the lower end of one of the arms 75. Each of these arms is provided with a sleeve-like end 78 through which the threaded rod 79 extends with its conical end 80 providing a center for the mounting of the holder 81 of the straight edged portion 82 of the lawn mower which is to be sharpened; and which is shown in working position in Figure 2. There is also mounted on this angle bar 73 a bracket 83 with a post 84 extending upwardly therefrom and a threaded member 85 to engage the straight edged portion of the lawn mower blade to prevent its turning and to also determine the position that it will take with reference to the grinding wheel 18 so that the proper bevel desired may be obtained.

This V-shaped member is held in its desired position as shown in Figure 2, by setting up the wing nut 69, see Figure 2 and Figure 8, when the slot 86 of the arm 71 is moved into position so that it receives the pin 67.

After the straight edged blade of the lawn mower has been sharpened, it is not necessary to remove it from the machine prior to sharpening the rotary portion, it being merely necessary to lift the wheel which may be easily done by tilting its carriage, loosening the wing nut 69 and tilting the entire cradle formed by the V-member 70 backwardly into a position shown in Figure 1, whereupon the notch 87 will now receive the pin 67 so that the wing nut may be again tightened to hold the work cradle in its new position.

The arm 72 is provided with a notch 88 in its end which receives a rod 89 of a part of the lawn mower, and this may be held in place by the nut or screw 90 and clamp plate 91; while another part of the lawn mower will be supported by the bar 92 having a crotch 93 formed by the arm 94 to receive the back roller of the lawn mower. This bar 92 is threadingly supported in a bracket 95 oscillatable about the bar 14 and adjustable by means of a slot 96 and set screw 97. The roller is shown in dotted lines at 98 and the general position of the lawn mower may be determined by the dot-dash lines in Figure 1. The rotary member or cutter 99 is shown with one of its blades extending upwardly towards the grinding wheel 18.

The edge of the blade is engaged by an arm shown in dotted lines at 100, which is mounted upon and swingable about the shaft 25 as a center and may be held in the desired position by the arcuate slot 101 and a set screw 102, shown in dotted lines in Figure 1. The end of this arm 103 engages the forward edge of the blade and as the wheel rotates in the direction of the arrow 104 will, of course, keep this work against this edge of the arm or guide finger, and as the wheel travels back and forth it will rotate or cause the helical blade of the rotary cutter to follow along and maintain its edge against the cutter in the desired adjusted position, which the same will assume for the proper bevel and shaping of its edge for cutting.

By the arrangement above described, it will appear that I may mount both parts of the lawn mower to be sharpened in the machine and selectively place each in a position to be operated upon by the grinding wheel. Further, by the arrangement of the motor on one side and the grinding wheel on the other of a tiltable platform, the same is nicely balanced and may be easily moved transversely of the machine back and forth to accomplish its desired operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a lawn mower sharpening machine, a frame, an abrasive tool supported thereon, a work cradle provided with two independent supports one for the rotary cutter blade and the other for the straight edge cutter blade of the lawn mower, and means for rockably mounting the cradle on the frame for selectively presenting either of said supports in proximity to the tool for grinding the work thereon.

2. In a lawn mower sharpening machine, a frame, an abrasive tool supported thereon, a work cradle provided with two independent supports each comprising pairs of arms one for the rotary cutter blade and the other for the straight edge cutter blade of the lawn mower, and means for rockably mounting the cradle on the frame for selectively presenting either of said supports in proximity to the tool for grinding the work thereon, said arms being located generally radially with respect to the axis of the rockable support.

3. In a lawn mower sharpening machine, a frame, an abrasive tool supported thereon, a work cradle provided with two independent supports one for the rotary cutter blade and the other for the straight edge cutter blade of the lawn mower, and means for rockably mounting the cradle on the frame for selectively presenting either of said supports in proximity to the tool for grinding the work thereon, said support for the straight edge cutting blade comprising means to support the blade in two different right angular positions.

4. In a lawn mower sharpening machine, means for mounting the work, a tool carriage, a single track for the carriage, said carriage being substantially wholly supported by said track but tiltable about said track as a center and slightly overbalanced on one side, a tool carried by said carriage on the overbalanced side, a guide parallel with said track at a different horizontal level, and adjustable means slidably secured to said guide and secured to said carriage at the overbalanced side to maintain the carriage in its adjusted position about its track.

5. In a lawn mower sharpening machine, means for mounting the work, a tool carriage, a single track for the carriage, said carriage being substantially wholly supported by said track but tiltable about said track as a center and slightly overbalanced on one side, a tool and a motor for driving the same both being mounted on said carriage, one on one side of the pivotal mounting and the other on the other side thereof in a relation to effect a counterbalancing action with the tool on the overbalanced side, a guide parallel with said track at a different horizontal level, and adjustable means slidably secured to said guide and secured to said carriage at the overbalanced side to maintain the carriage in its adjusted position about its track.

6. In a lawn mower sharpening machine, means for mounting the work, a tool carriage, a single track for the carriage, said carriage being substantially wholly supported by said track but tiltable about said track as a center, a tool carried by said carriage, a guide parallel with said track at a different horizontal level, and adjustable means slidably secured to said guide and secured to said carriage to maintain the carriage in its adjusted position of tilt about its track.

PURDOM CARPENTER.